(12) United States Patent
De Los Reyes et al.

(10) Patent No.: US 6,365,023 B1
(45) Date of Patent: Apr. 2, 2002

(54) ELECTRODEIONIZATION PROCESS

(75) Inventors: Gastón De Los Reyes, Boston; Linda M. Denoncourt, Andover; Bienvenido Garcia, West Roxbury, all of MA (US)

(73) Assignee: Millipore Corporation, Bedford, MA (US)

( * ) Notice: Subject to any disclaimer, the term of this patent is extended or adjusted under 35 U.S.C. 154(b) by 0 days.

(21) Appl. No.: 09/888,303

(22) Filed: Jun. 22, 2001

Related U.S. Application Data (60) Provisional application No. 60/213,333, filed on Jun. 22, 2000.

(51) Int. Cl.$^7$ ............................................... B01D 61/48
(52) U.S. Cl. ...................... 204/524; 204/533; 204/536
(58) Field of Search ................................. 204/524, 533, 204/536

(56) References Cited

U.S. PATENT DOCUMENTS

| | | |
|---|---|---|
| 4,632,745 A | 12/1986 | Giuffrida et al. |
| 4,925,541 A | 5/1990 | Giuffrida et al. |
| 4,931,160 A | 6/1990 | Giuffrida |
| 5,154,809 A | 10/1992 | Oren et al. |
| 5,308,466 A | 5/1994 | Ganzi et al. |

FOREIGN PATENT DOCUMENTS

| | | |
|---|---|---|
| JP | 7-43188 | 7/1993 |

*Primary Examiner*—Arun S. Phasge
(74) *Attorney, Agent, or Firm*—Paul J. Cook; John Dana Hubbard (57) ABSTRACT

An electrodeionization-based process for purifying water to remove ionic species is disclosed. Ionic removal is accomplished by supplying an electrical current between an anode and a cathode of an electrodeionization module in the range of about 1.5 to 15 times a "theoretical minimum current". The current is supplied by a power source capable of automatically increasing or decreasing voltage in response to a change in the electrical impedance of the electrodeionization module to maintain constant current. Conduct of the process on pretreated water yields deionized water of good quality, while maintaining conditions that promote the longevity of the electrodeionization module.

6 Claims, 8 Drawing Sheets

ELECTRODEIONIZATION PROCESS

REFERENCE TO RELATED APPLICATION

This application claims the benefit of Provisional U.S. Patent Application Ser. No. 60/213,333, filed Jun. 22, 2000.

FIELD

This invention relates in general to an electrodeionization (EDI) process wherein liquid to be purified is passed through an ion depletion compartment containing anion and/or cation resin beads under the influence of a polar field to effect ion transfer from the liquid in the ion depletion compartment to a liquid in an ion concentration compartment.

BACKGROUND

The purification of a liquid by reducing the concentration of the ions or molecules in the liquid has been an area of substantial technological interest. Many techniques have been used to purify and isolate liquids or to obtain concentrated pools of the specific ions or molecules from a liquid mixture. Known processes for purifying liquids include distillation, electrodialysis, reverse osmosis, liquid chromatography, membrane filtration and ion exchange. Another method is electrodeionization.

An early apparatus and method for treating liquids by electrodeionization was disclosed in U.S. Pat. Nos. 2,689,826 and 2,815,320. U.S. Pat. No. 2,689,826, issued to P. Kollsman on Sep. 21, 1954, describes an apparatus and process for the removal of ions within a liquid mixture in a depletion chamber through a series of anionic and cationic diaphragms into a second volume of liquid in a concentration chamber under the influence of an electrical potential which causes the pre-selected ions to travel in a predetermined direction. The volume of the liquid being treated is depleted of ions while the volume of the second liquid becomes enriched with the transferred ions and carries them in concentrated form. U.S. Pat. No. 2,815,320, issued to P. Kollsman on Dec. 3, 1957, describes the use of microporous beads formed of ion exchange resins as a filler material positioned between the anionic or cationic diaphragms. This ionic exchange resin acts as a path for ion transfer and also serves as an increased, conductivity bridge between the membranes for the movement of ions.

The term "electrodeionization" refers to the process wherein an ion exchange material is positioned between anionic and cationic diaphragms. The term "electrodialysis" refers to such a process which does not utilize ion exchange resins between the anionic and cationic diaphragms. Illustrative of other prior art attempts to use a combination of electrodialysis and ion exchange materials or resins to purify saline from brackish water are described in U.S. Pat. Nos. 2,794,770; 2,796,395; 2,947,688; 3,384,568; 2,923,674; 3,014,855; and 4,165,273. Attempts to improve electrodeionization apparatus are shown in U.S. Pat. Nos. 3,149,061; 3,291,713; 3,515,664; 3,562,139; 3,993,517; and 4,284,492.

A commercially successful electrodeionization apparatus and process is described in U.S. Pat. No. 4,632,745, issued to A. Giuffrida et al. on Dec. 30, 1986. The apparatus utilizes ion depletion compartments containing an ion exchange solid composition and a concentration compartment which is free of an ion exchange solid material. The electrodeionization apparatus includes two terminal electrode chambers containing an anode and a cathode respectively which are utilized to pass the direct current transversely through the body of the apparatus containing a plurality of ion depletion compartments and ion concentrations compartments. In operation, the dissolved ion salts of the liquid are transferred through the appropriate membranes from the ion depletion compartments to the ion concentration compartments. The ions collected in the ion concentration compartments are removed through discharge outlets and then directed to waste.

In present electrodeionization processes, feed water is initially pretreated in a reverse osmosis step to reduce the ionic load and colloidal contaminants therein, prior to being directed towards electrodeionization. This practice extends the useful life of the resin beads used in electrodeionization. However, even when using a reverse osmosis pretreating step, the presence of certain carbonic species (including dissolved $CO_2$, $H_2CO_3$, $HCO_3^-$ and $CO_3^{-2}$) in the feed water causes problems in the overall process. Generally, ionized carbonic species such as $HCO_3^-$ and $CO_3^{-2}$ are retained by the reverse osmosis (RO) membrane. However un-ionized species such as $CO_2$ and $H_2CO_3$ readily pass through the RO membrane. In electrodeionization, carbonate producing species such as $CO_2$ and $H_2CO_3$ can cause so-called "scaling" in the ion concentration compartments due to precipitation of calcium ion and magnesium ion at the anionic membrane, particularly at neutral to high pH conditions. Scaling can result in a substantial reduction of the useful life of the electrodeionization apparatus.

Thus, two common problems encountered in the practice of EDI are (a) inadequate ionic removal which can lead to poor water quality and (b) scaling, which when unattended, can quickly lead to premature failure of an EDI module.

A number of factors can lead to poor water quality. However, for a well designed and constructed EDI module, insufficient electrical current is the most common source of poor water quality. This occurs because a certain minimum current is required to remove the ionic contaminants. Furthermore, the higher the ionic content of the feed water, the higher the current required to effectively remove contaminants and produce good water quality. Good water quality is defined herein by the resistivity of the water which is typically desired to be no lower than approximately 3 mega-ohm-cm, more preferably above 5 mega-ohm-cm, and most preferably greater than 10 mega-ohm-cm.

A number of factors can lead to scaling, for example, the presence of hard ions such as $Ca^{-2}$ or $Mg^{-2}$ in high concentrations in the water feeding the EDI module. Some manufacturers of EDI modules specify that $Ca^{-2}$ levels be maintained below 0.5 ppm to prevent scaling. Scaling typically occurs in the boundary layers adjacent to the cathode and to the anionic membrane on the side facing the waste compartments due to the high pH conditions typical of these regions. In the cathode, electrochemical reactions typically produce hydroxide reactions ($OH^-$); in the waste side of the anion membrane high hydroxide ion concentration occurs as the result of their transport through the membrane. It is believed that the pH at the boundary layer increases with current. Therefore, the current needs to be maintained at a sufficiently low level to prevent or, at least ameliorate, the incidence of scaling.

In view of the above, it is necessary to maintain the current passing through the EDI module within an acceptable range. If the current is too low, poor water quality is obtained. If the current is too high, the incidence of scaling increases.

Presently, EDI modules typically operate using a constant voltage power supply. Unfortunately, it has been observed that the electrical impedance of EDI modules increases with the age of the module. Although the cause of the impedance increase is not known, it is thought to be due to absorption of contaminants into the ion exchange media which, in general tends to increase the specific impedance of ion exchange resins. This impedance increase means that as the EDI module ages, the current passing through the module decreases when powered with a constant voltage power supply. Thus, over time a low enough current may be reached as to result in inadequate water quality. Likewise, a new module having a low impedance and run at constant voltage can produce a very high current thereby increasing the incidence of scaling. Therefore, the aging of the EDI module results in a large variation in current during its lifetime; variations that can produce electrical currents outside a desired operating range.

In addition to reduced longevity, it is also well-known that the impedance of an EDI module increases with decreasing temperature. Thus, during warm summer months, EDI modules may produce very good water quality, while, during the cold winter months when the tap water temperature may be as low was 4 degrees centigrade, the module may not obtain sufficient current to remove all of contaminants when operated under constant voltage conditions. Alternatively, while the risk of scaling may be low in winter, it increases during the summer as the operating electrical current increases. Thus, seasonal variations can also lead to changes in the EDI modules' electrical impedance, and result in electrical currents outside a desired operating range. Therefore, constant voltage power supplies present a problem if one wishes to maintain reliable performance long-term and across the seasons of the year.

Due to the problems set forth above, undesirable performance, unscheduled maintenance, possible shutdowns, and high operation costs may ensue.

It is an object of this invention to provide a process for the reliable production of good quality deionized water under varying environmental conditions and/or in the presence of undetermined species and concentrations of contaminants in feed water. It is still another object of this invention to provide a robust EDI-based purification process, i.e., one tolerant to extremes in operating conditions encountered in varying potential installations as well as extremes due to seasonal cycles. It is also an object of this invention to provide an EDI module having good longevity.

Accordingly, a need exists for an electrodeionization process configured for a substantially reduced incidence of "scaling"—especially with liquid feeds containing substantial amounts of hard ions, such as $Ca^{++}$ and $CO_2$—and thereby, promoting a substantial increase in the useful life of an apparatus employed for carrying out said process.

SUMMARY

The present invention proposes that an optimal current range for operating an EDI module which necessitates the use of a power supply that adjusts the current to maintain it within the desired range rather than utilizing a constant voltage supply. By operating an electrodeionization module within a specific current range, acceptably pure water is obtained while scaling caused by the presence of $Ca^{tt}$, $Mg^{tt}$, and $CO_2$, is substantially reduced or eliminated. When operating the EDI module at a current below the desired current range, the ions are not removed from the feed water thereby preventing obtaining a product having a conductivity within the desired resistivity of 5–15 meg-ohm range. When operating at a current above the desired current range, undesirable scaling within the cells occurs.

The lowest current within the desired current range is determined by mass balance considerations. There is a theoretical minimum current required to remove all ions from a feed water stream. This theoretical minimum is given by a form of Faraday's Law, derived and based on the recognition that the current inside the EDI module is carried by the ions moving from one compartment to an adjacent compartment. At least one faraday of electric charge is necessary to remove one equivalent of ions from the feed water to the EDI module. Thus, the theoretical minimum current is directly proportional to the ionic load presented to the EDI module. The ionic load is defined as the product of the water flow-rate-per diluting-cell, q[liters/hour] and the ionic concentration of the feed water, C [equiv./liter]. These considerations lead to the following equation:

$$I^* = \frac{Q \times C \times F}{3600 \times N}$$

wherein,

I*=theoretical minimum current [amps or coulombs/sec.];
Q=product water flow rate to entire EDI module [liter/hour];
C=total ion concentration [equiv./liter];
F=Faraday's constant=96,500 coulombs/equiv.; and
N=number of cells in the electrodeionization cell.

While in theory a current equal to I* should remove all contaminant ions, in practice, a higher current is required. We have discovered that, to get reliable removal of ions sufficient to produce good water quality, a current at least equal to 1.5×I* is desired. Furthermore, the maximum operating current—while greater than 1.5×I*—should be less than 15×I*, preferably less than about 10×I*, and most preferably less than about 5×I*, in order to minimize scaling.

In the process of this invention, water is introduced into the compartments containing the resin beads while an electrical voltage is applied between an anode and a cathode positioned on either side of the compartments containing the resin beads. The current is monitored and adjusted during processing so that the current is maintained within a predetermined range where good water quality is obtained and scaling in the electrodeionization compartments is minimized or eliminated. Water to be purified is passed through the ion depletion compartments, while water in the concentration compartments, after accepting ions from the ion depletion compartments, is discarded. The electrodeionization step can be operated by passing the water being treated in one pass through a given ion depletion compartment or by effecting serpentine flow within two adjacent ion depletion compartments.

The electrodeionization process described herein is subject to variation. For example, the process can be conducted under conditions where voltage polarity is reversed periodically. Additional process steps can also be added. For example, an ultra-filtration step downstream of the EDI module can further improve product purity or by a preliminary step wherein water to be purified is subjected to reverse osmosis and/or exposed to ultraviolet radiation under a wave length that promotes oxidation of organics, e.g., 185 nm so that substantially complete removal of total organic carbon (TOC) can be effected.

These and other embodiments of the invention, as well as other advantages relating to the practice of the invention, will be better appreciated from the following detailed description construed with consideration of the attached drawings.

DETAILED DESCRIPTION

The present invention is directed toward an electrodeionization-based process for purifying water to remove ionic species contained therein. Ionic removal is accomplished by supplying a constant electrical current between an anode and a cathode of an electrodeionization module in the range of about 1.5 to 15 times a "theoretical minimum current". This is accomplished while passing water through the electrodeionization module, particularly, its ion depletion and concentration compartments.

The electrodeionization module contemplated in respect of the present invention are those that comprise, between a cathode and an anode, at least one ion depletion compartment interposed adjacently between a pair of ion concentration compartments, and wherein each compartment contains an ion-exchange medium. Skilled artisans will appreciate that such electrodeionization module is subject to varying configurations. Regardless, all such configurations can be employed to advantage in the practice of the present invention. Details of such configurations and the construct and organization of their sub-components are provided further hereinbelow.

According to the present invention, the theoretical minimum current ($I^*$) is determined by the formula $I^*=(Q \times C \times F)/3600 \times N$. "Q" is the total water flow rate of the water passing through all of the ion depletion comports used in the electrodeionization module and is measured in liters/hour. "C" is total ion concentration, which is measured in equivalents/liter. "F" is Faraday's Constant (i.e., 96,500 coulombs/equivalent). "N" is the total number of ion depletion compartments used in the electrodeionization module.

Constant electrical current—a condition important to the practice of the present invention—is accomplished by supplying it from a power source capable of automatically increasing or decreasing its voltage in response to a change in the electrical impedance of the electrodeionization module. Constant current power sources are known, are commercially available, and the subject of a number of patents. See e.g., U.S. Pat No. 4,131,939, issued to R. Day on Mar. 30, 1977; U.S. Pat. No. 4,352,057, issued to T. Okada et al. on Sep. 28, 1982; and U.S. Pat. No. 4,748,551, issued to R. Dickey on May 31, 1988. In one desirable embodiment of the present invention, the power supply is an HP DC power supply providing a constant current in the range of 0 to 0.25 amps, commercially obtainable from Hewlett Packard of Palo Alto, Calif. (Model No. E3612A).

Figure 1:
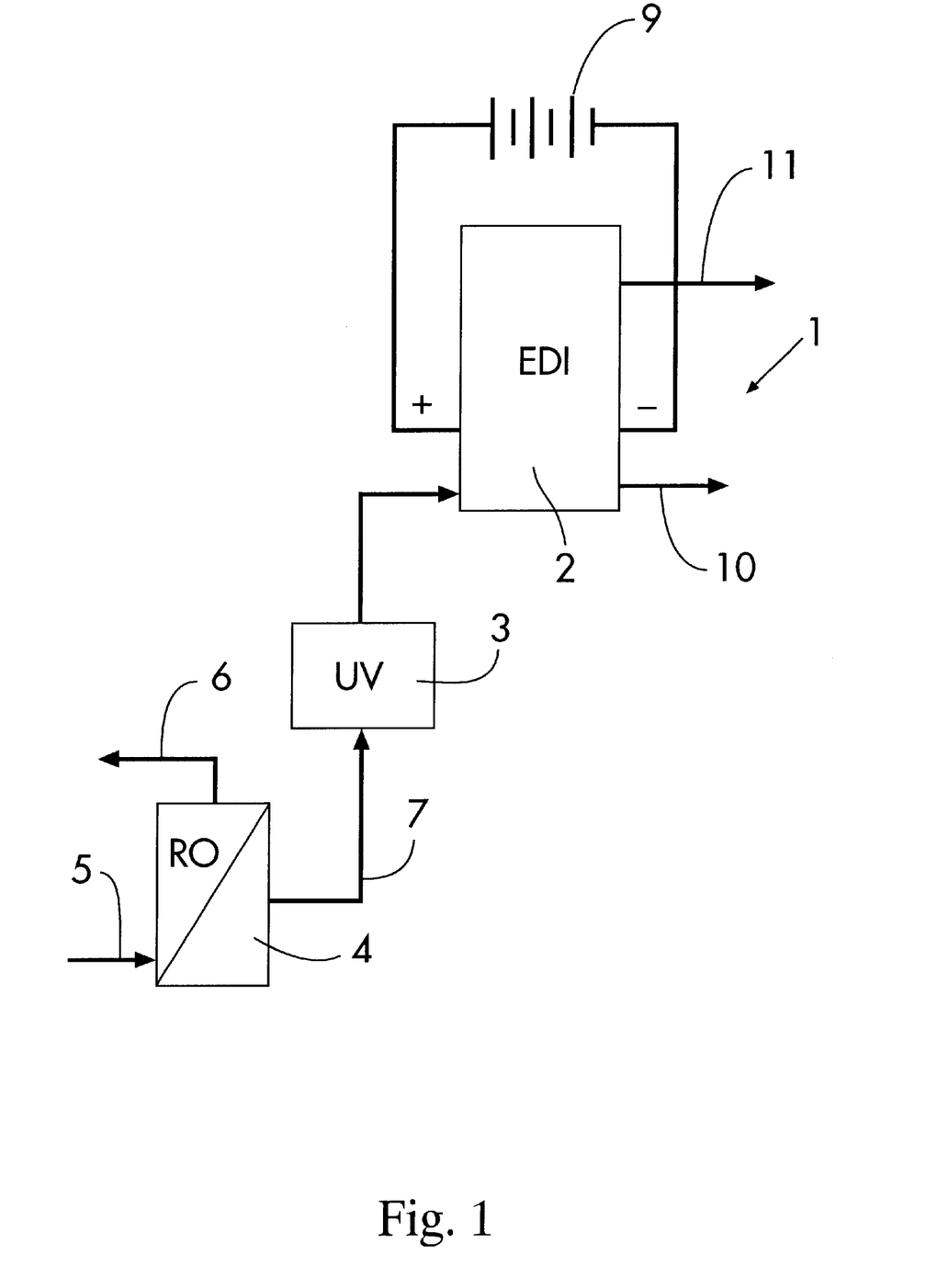
FIG. 1 is a flow diagram illustrative of an electrodeionization process invention.

In FIG. 1, an electrodeionization system 1 according to an embodiment of the present invention is illustrated. The electrodeionization system 1 includes an electrodeionization (EDI) step 2, an ultraviolet (UV) treatment step 3, and a reverse osmosis (RO) step 4. Liquid feed 5—which supplies essentially raw water to be purified—is introduced into the reverse osmosis step 4 to produce a so-called RO waste stream 6 and a product stream 7. The RO product stream 7 is directed to the UV treatment step 3 and exposed to ultraviolet light to reduce the "Total Organic Compound" (TOC) content in the product stream 7. The resulting product stream 8 is them directed to the EDI step 2 which is operated within a current range by a power supply 9 consistent with the scope of the present invention.

In a preferred mode of practicing the present invention, electrodeionization is conducted with uniformly sized anion exchange beads and uniformly sized cation exchange beads, for example, as disclosed in U.S. Pat. No. 5,154,809, issued to Y. Oren et al. on Oct. 13, 1992. Although, the invention is generally described herein assuming use of such uniformly sized ion exchange beads, it is to be understood that the present invention can be practiced with non-uniformly sized ion exchange beads, if desired.

Suitable uniform size ionic resin beads include DOWEX MONOSPHERE resin beads 550A and 650C available from Dow Chemical Company, Midland, Mich. "Substantially uniform size" as used herein means that 90% of the beads are within ±10% of the mean bead size and that the relative average size of one ionic form of resin beads to a second ionic form of resin beads in a mixture of resin beads is at least 0.8. The 550A beads and 650C beads have 90% of the beads within ±10% of the mean bead size. The mean bead size of the 550A anionic resin beads is 550 micrometers while the 650C cationic resin beads has a mean bead size of 650 micrometers. The relative average size of the cationic resin beads to the anionic resin beads or vise versa should be at least about 80 percent of the other resin beads, preferably of substantially equal average size. In use, anionic resin beads, cationic resin beads or a mixture of anionic resin beads and cationic resin beads are placed into ion depletion compartments and may be placed into ion concentration compartments prior to passing water through the electrodeionization device. Water is then passed through the compartments containing the resin beads until the extractables removed from the beads into the water reaches a substantially constant low level. Water to be purified then is passed through the ion depletion compartments which are positioned in alternating relationship with ion concentration compartments. The ion depletion compartments are defined by alternating anion permeable membranes and cation permeable membranes which are sealed in a manner to prevent leakage between ion depletion compartments and ion concentration compartments. The ion depletion compartments contain a mixture of anion resin beads and cation resin beads to promote ion transfer from water in the ion depletion compartments. The alternating ion depletion compartments and ion concentration compartments are positioned between an anode and a cathode. Water to be purified is passed through the ion depletion compartments while water used to accept ions from the ion depletion compartments is passed through the ion concentration compartments. In operation, an electrical voltage is applied between the anode and cathode which promotes ion transfer from the water in the ion depletion compartments through the anion permeable membrane and the cation permeable membrane and into the water passing through the adjacent ion concentration compartments. In electrodeionization, the ions removed from the water are not retained by the membranes or resin beads but are removed with the water passing through the ion concentration compartments. Therefore, electrodeionization can be operated continuously without the need to replace or regenerate the resin particles of the membranes.

In a specific embodiment of this invention, electrodeionization is conducted by the process and with the apparatus disclosed in U.S. Pat. No. 4,632,745, issued to Giuffrida et al. on Dec. 30, 1986.

As disclosed in U.S. Pat. No. 4,632,745, an electrodeionization apparatus is provided wherein each electrodeionization electrical stage includes an anode and a cathode and a series of ion depletion compartments that contain a mixture of anion exchange resin and cation exchange resin. Ion depletion compartments are formed so that the ion exchange resin mixture is housed within independent discrete sub-compartments each of which has a width between about 0.3 and 4 inches, preferably between about 0.5 and 1.5 inches. The discrete sub-compartments are formed by securing, such as by bonding, both the anion permeable membrane and the cation permeable membrane to the periphery of the depletion compartment and to ribs which extend across the thickness of and along the entire length of the depletion compartment so that each sub-compartment is defined by a pair of ribs, the anion permeable membrane and the cation permeable membrane. The thickness of the sub-compartments as defined by the distance between the anions permeable membrane and the cation permeable membrane is between about 0.05 and 0.24 inches, preferably between about 0.06 and 0.125 inches. In this embodiment, it has been found that the thickness and width of the depletion compartments are important to effecting efficient operation of the electrodeionization apparatus. The solid ion exchange material positioned within the sub-compartments are constrained from moving between sub-compartments by the ribs and ion permeable membranes.

The electrodeionization apparatus can comprise one or a plurality of stages. In each stage, an anode is positioned at an end of a stack of depletion and concentration compartments opposite an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentration compartments constructed as set forth herein. The liquid to be depleted of ions can be passed in parallel through each depletion compartment in each stage and a second liquid can be passed through each concentration compartment in parallel in each stage in order to effect removal of ions from the first liquid in the depletion compartments into the second liquid in the concentration compartments. When a plurality of stages are utilized, the liquid removed from the depletion compartments in an upstream stage can be directed in series into the depletion compartments in the next adjacent downstream stage. Similarly, the liquid removed from the concentration compartments of an upstream stage can be directed in series to the concentration compartments in the next adjacent downstream stage. Electrolyte can be passed through the spacer adjacent each electrode in the electrodeionization apparatus and is removed from the electrodeionization apparatus.

The sub-compartments in the depletion compartments have a controlled thickness and width promoting high efficiency for ion depletion over long time periods. There is no limit on the length of the compartment other than as dictated by practical construction and fluid pressure loss considerations. Obviously, the longer the sub-compartment length, the greater the ion removal from the liquid therein. Generally, the length of the sub-compartments are between about 5 inches and about 70 inches. When it is desired to remove only a particular anion or particular cation, 100% of the appropriate exchange material is used. Usually, it is desired to remove both cations and anions in order to produce a purified liquid product. The ratio of anion exchange resin beads to cation exchange resin beads generally are about 60 to 40 by volume. By utilizing the sub-compartment structure in the depletion compartments, efficient mixing of the liquid and the beads therein is attained while avoiding channeling of the liquid through the depleting compartment. Thus, efficient interchange of the ions and the liquid in the depletion compartment with the ions in the beads to effect ion removal from the liquid in the depletion compartment is attained. Furthermore, it has been found that by controlling the geometry of the sub-compartment as set forth herein, relatively low energy requirements for this electrodeionization apparatus can be utilized even over long periods to attain desired liquid purity.

Figure 2:
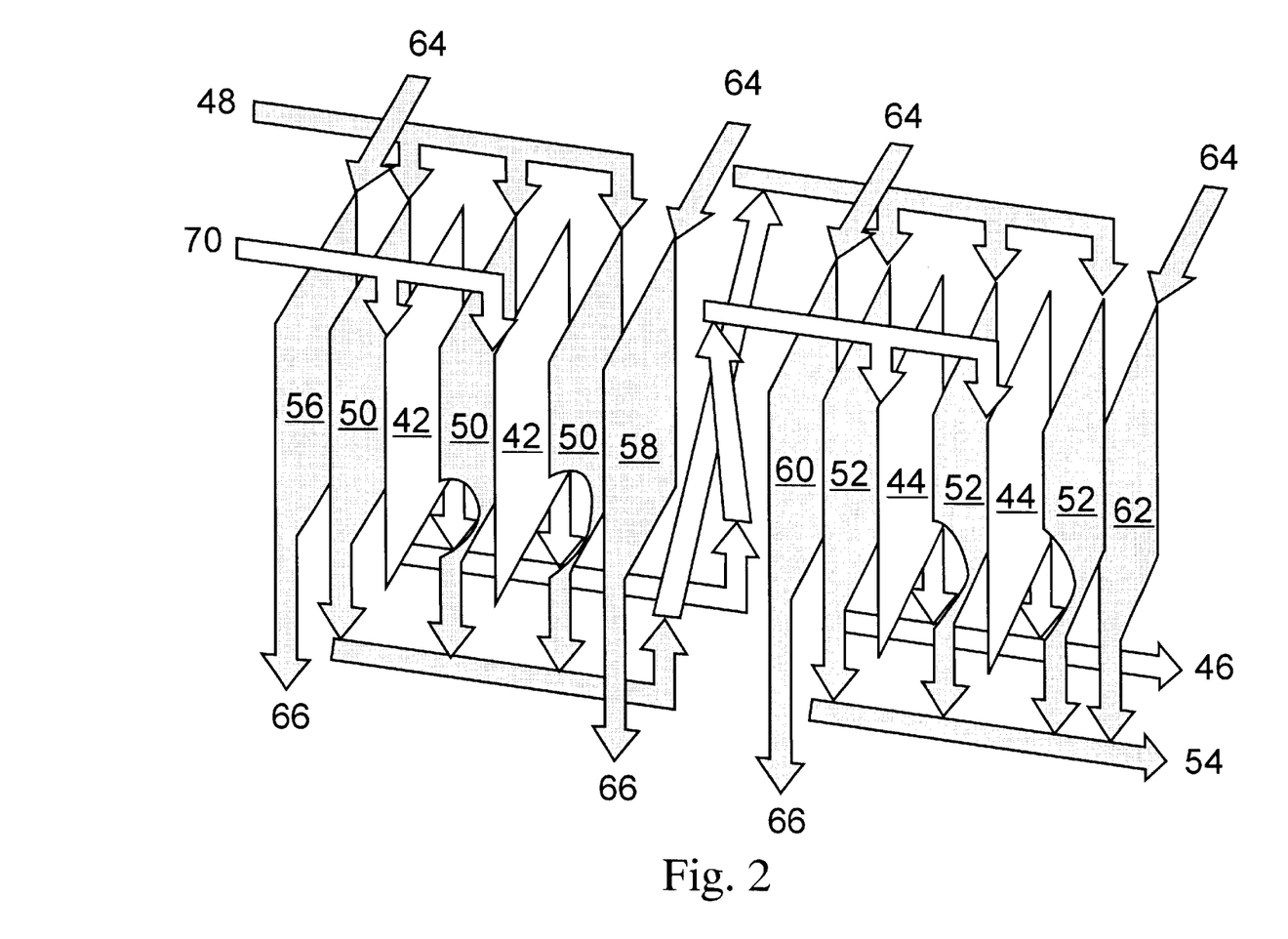
FIG. 2 is a schematic view illustrating a product embodiment of the electrodeionization process according to the present invention.

Referring to FIG. 2, the flow paths of the liquids in the various compartment are explained. Liquid to be purified enters into 40, passes through depletion compartments 42, is then passed through depletion compartments 44 and is recovered from outlet 46. Concentrating liquid is passed through depletion compartments 44 and is recovered from outlet 46. Concentrating liquid is passed through inlet 48 through concentration compartments 50 and 52 and hence through outlet 54 to drain. Liquid electrolyte is circulated through electrode compartments, 56, 58, 60 and 62 from inlets 64 and is discarded to drain through outlets 66.

Any anion permeable membrane or cation permeable membrane having the strength to withstand the operating pressure differential, typically up to about 5 psi, can be utilized in the present invention. The sealing of the membranes to the ribs forming the sub-compartments permits the use of higher operating pressures and enhances the assembly strength. Representative suitable anion permeable membranes include a homogeneous type web supported styrene-divinylbenzene based with sulfonic acid or quaternary ammonium functional groups sold under the identifications CR61-CZL-386 and AR 103-QZL 386 by Ionics, Inc.; a heterogeneous type web supported using styrene-divinylbenzene based resins in a polyvinylidene fluoride binder sold under the identifications MC-3470 and MA-3475 by Sybron/Ionic; homogeneous type unsupported-sulfonated styrene and quaternized vinylbenzylamine grafts of polyethylene sheet sold under the name, Raipore by RAI Research Corporation; a homogeneous type web supported styrene-divinylbenzene based with sulfonic acid or quaternary ammonium functional groups sold under the name Aciplex by Asabi Chemical Industry, Ltd.

Electrodeionization can be controlled by measuring product water conductivity from all or any one of the stages and adjusting the process parameters including process voltage, liquid flow velocities, temperatures, pressures, and electrical current accordingly.

In another aspect of this invention, the electrodeionization step can be operated under conditions of serpentine flow between an anode and a cathode. In accordance with one aspect of this invention the depletion compartments are arranged and are provided with inlet and outlet means so that water to be purified is passed through at least two depletion compartments between a given set of an anode and a cathode in each stage. Improved ion removal efficiency is attained with the multiple pass process of this embodiment of the invention as compared to a process wherein water to be purified is passed through one depletion compartment in each stage having a length equal to the combined lengths of the multi depletion compartments in each stage. The depletion compartments also are formed so that the ion exchange remain mixture is housed within independent discrete sub-compartments each of which has a width of about 0.3 inches to 4 inches, preferably between about 0.5 and about 1.5 inches. The discrete sub-compartments also are formed by securing, such as by bonding both the anion permeable membrane and the cation permeable membrane to the periphery of the depletion compartment and to ribs which extend across the thickness of an along the entire length of the depletion compartment so that each sub-compartment is defined by a pair of ribs, the anion permeable exchange membrane and the cation permeable membrane.

In this embodiment electrodeionization apparatus can comprise one or a plurality of stages. In each stage, an anode is positioned at an opposite end of a stack of depleting and concentrating compartments from an end at which a cathode is positioned. Each anode and cathode is provided with an adjacent electrode spacer and an ion permeable membrane wherein an electrolyte passes through the electrode spacer. The remaining portion of each stage comprises a series of alternating depletion and concentrating compartments constructed as set forth herein. The liquid to be depleted of ions can be passed in parallel through each depletion compartment in each stage. The direction of flow within the depletion compartments is not critical and can be in the same direction or in an opposite direction to the flow in an adjacent compartment or concentration compartment. When a plurality of stages are utilized, the liquid removed from the depleting compartments in an upstream stage can be directed in series into the depleting compartments in the next adjacent downstream stage. Alternatively, feed water can be directed in a counter flow arrangement in depleting compartments comprising a second stage. Electrolyte can be passed through the spacer adjacent each electrode in the electrodeionization apparatus and is removed from the electrodeionization apparatus. It is preferred that the sub-compartment in the depleting compartments have a controlled thickness and width as stated above in order to sustain high efficiency for ion depletion over long periods.

Figure 3:
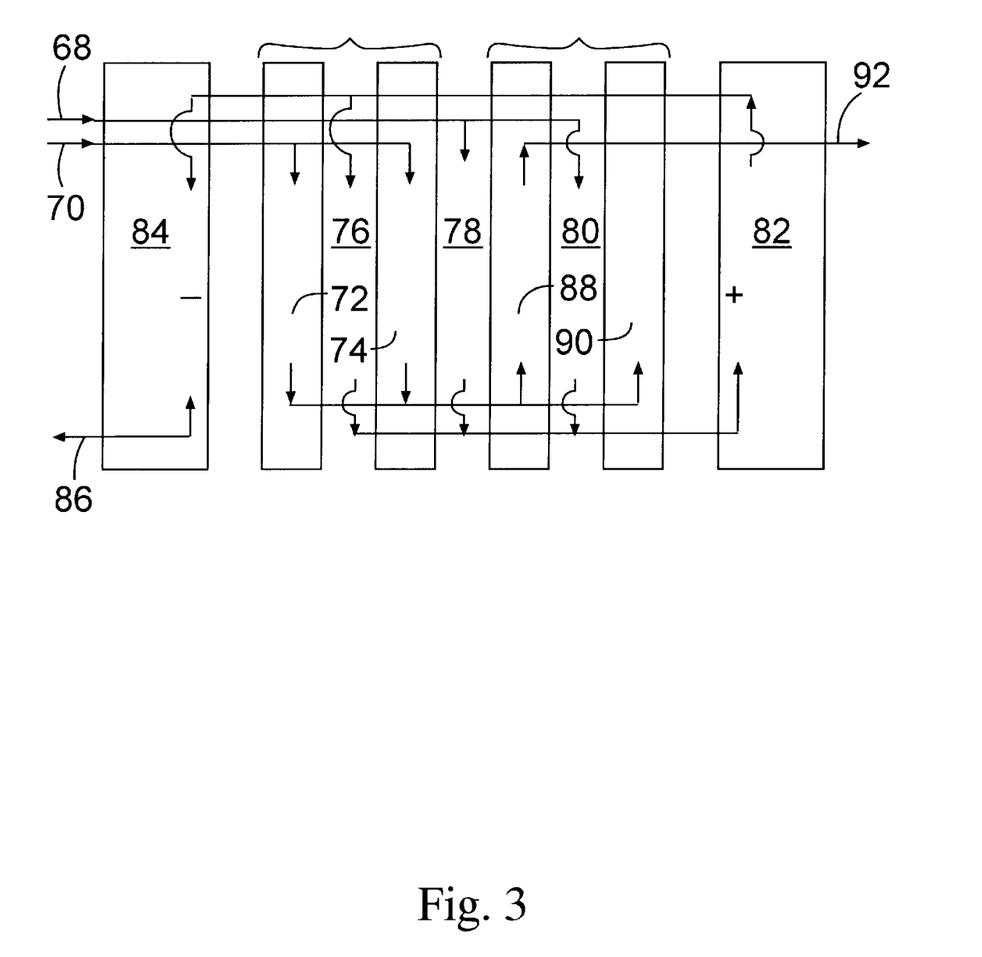
FIG. 3 is a schematic view of another product embodiment of the electrodeionization process according to the present invention.

As shown in FIG. 3, water to be purified 70 enters depletion compartments 72 and 74 which contains substantially uniform size resin beads. Concentration water feed stream 68 enters concentration compartments 76, 78 and 80 into anode compartment 82 and thence to cathode compartment 84 and to drain 86. The water to be purified passes from depletion compartments 72 and 74 through depletion compartments 88 and 90 and then is recovered from stream 92.

In another aspect of this invention, the electrodeionization steps described above can be operated under conditions of voltage polarity reversal during water purification. During operation, the polarity of voltage applied to the electrodes in the electrodeionization apparatus is reversed in order to dissolve and desorb organics at the cathode, to oxidize deposits and dissolve any scale at the anode, to dissolve any scale from prior cycles in the newly formed depletion compartments and to desorb any adsorbed foulants that may be deposited during use of the apparatus in the newly formed concentration compartments. As a result of voltage polarity reversal, the compartments which were initially ion depleting compartments become ion concentrating compartments. There is no need to direct product liquid to waste as a consequence of voltage polarity reversal since there is an unexpected rapid ion migration and ion depletion within the newly formed ion depletion compartments combined with a time delay in the increase of concentration in the newly formed concentration compartments such that the product liquid never attains an unacceptably high concentration of ions. Also, the time between reversal cycles can be extended due to an unexpected time delay of any pH shifts in the concentrating and cathode streams thereby decreasing the scaling potential in the device.

As set forth herein, the term "dual compartment" means a compartment formed of an odd number of permeable membranes, at least one depletion compartment and at least one concentration compartment, each of which compartments are divided into sub-compartments, as described above. The ion permeable membranes are arranged so that the anion permeable membrane and the cation permeable membrane alternate along the thickness of the dual compartment. Thus, the dual compartment can include one more cation permeable membrane than anion permeable membrane or can include one more anion permeable membrane than cation permeable membrane of the odd number ion permeable membranes. It has been found in accordance with this invention that the dual compartment structure permits reversing voltage polarity in a manner which does not require directing a portion of the liquid product to waste due to the presence of the solid ion exchange material positioned within the sub-compartments by the ribs and by the ion permeable membranes.

The electrodeionization apparatus can comprise one of a plurality of stages. In each stage, the anode is positioned at an opposite end of a stack of depleting and concentrating compartments from an end at which the cathode is positioned. Each anode and cathode is provided with an adjacent electrode spacer and an ion permeable membrane wherein an electrolyte passes through the electrode spacer. The remaining portion of each stage comprises a series of alternating depletion and concentration compartments constructed as set forth herein. The liquid to be depleted of ions can be passed in parallel through each depletion compartment in each stage and a second liquid can be passed through each concentration compartment in parallel in each stage in order to effect removal of ions from the first liquid in the depletion compartment into the second liquid into the concentration compartment. When a plurality of stages are utilized, the liquid removed from the depletion compartments in an upstream stage can be directed in series into the depletion compartments of the next adjacent downstream stage. Similarly, the liquid removed from the concentration compartments of an upstream stage can be directed in series to the concentration compartments in the next adjacent downstream stage. Electrolyte can be obtained from the feed, product, neutral, or concentrate streams or from an independent source and passed through the spacer adjacent to each electrode in the electrodeionization apparatus and is removed from the electrodeionization apparatus. Optionally, electrolyte from the spacer adjacent the electrode can be passed through one or more neutral zones prior to being directed to waste. Scale and organics build up within the electrodeionization apparatus, particularly at the electrodes, also can be prevented by periodically reversing the voltage polarity such that the original anode becomes a cathode and the original cathode becomes the anode. When voltage polarity is reversed, the original depletion compartments become concentration compartments and concentration compartments become depletion compartments. At the electrodes any accumulated scale is cleaned during the anodic cycle and any accumulated organics are dissolved during the cathodic cycle and are removed. Also, any accumulated scale in the concentrating compartments is dissolved during the initial period of the diluting cycle and is rinsed to drain. In addition, any organic foulants accumulated during the diluting cycle are desorbed from the resin and membranes during the concentrating cycle by the action of increased salinity and pH and removed in the waste stream so that their presence does not adversely affect the quality of the water or function of the equipment.

During voltage polarity reversal, it would be expected that a portion of the liquid recovered from the compartments would need be discarded since ion removal would not be sufficiently rapid during the polarity reversal. However, the ion removal from the newly formed depletion compartments is sufficiently rapid and during the initial period after reversal there is a delay time between polarity reversal and deterioration of water quality in the newly formed concentration stream so that the liquid product need not be discarded at any time during or between any cycle. In other words, the conductivity of the liquid product from either or both of the newly formed depletion or concentration compartments are sufficiently low as to render the liquid product acceptable in one stream or the other stream or both. This result is very desirable since it eliminates the need for valving and conduit means for directing a portion of the liquid product from the newly formed depletion compartment to waste followed by a reversal of the system flow to effect recovery of the liquid product from the newly formed depletion compartments. Also, since polarity reversal permits continuous recovery of high quality products, the need for a holding tank system with associated pumping capacity is desirably eliminated.

Figure 4:
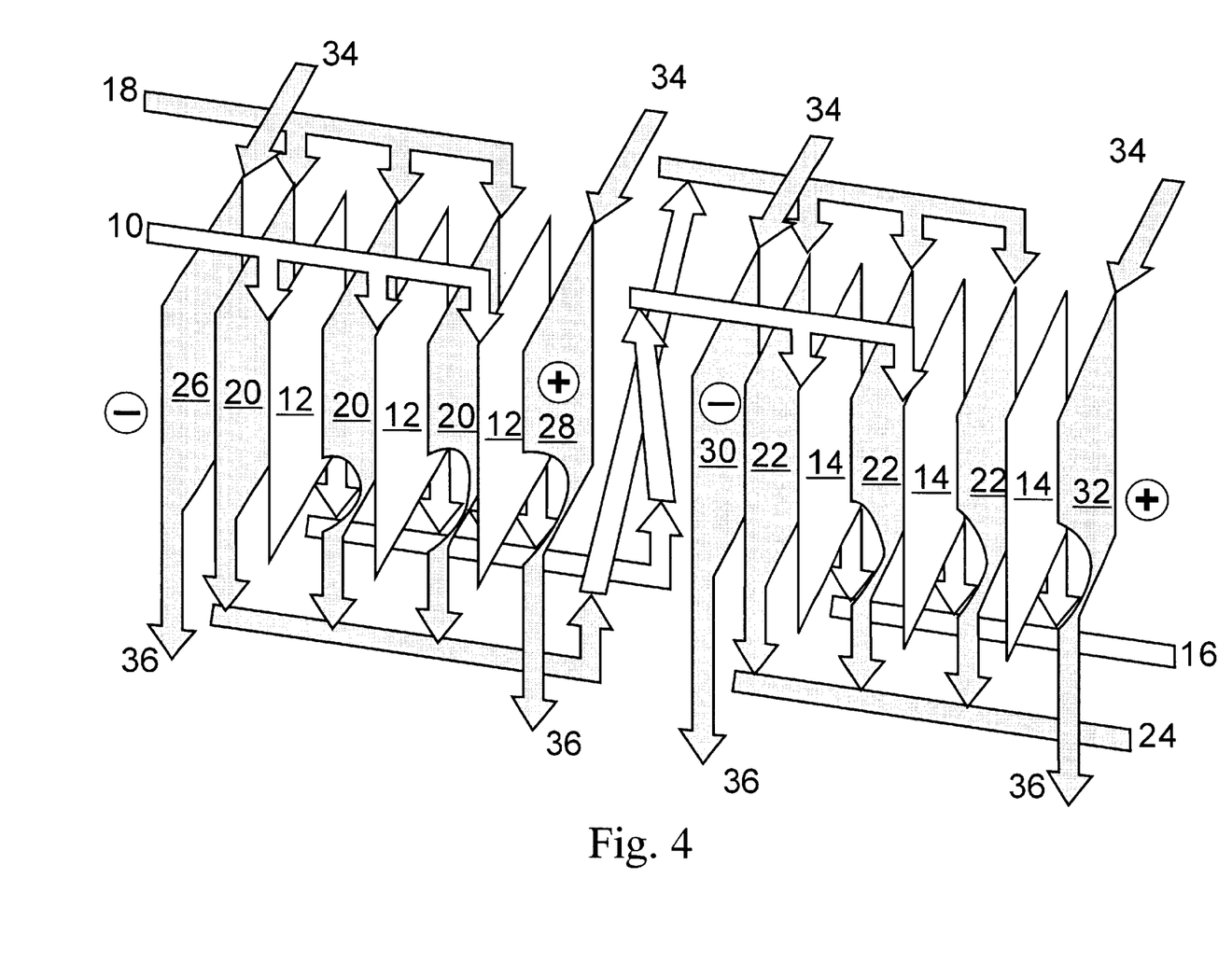
FIGS. 4 and 5 are schematic views illustrating another product embodiment of the electrodeionization process according to the present invention, in particular, an embodiment wherein polarity is reversed during electrodeionization.

Referring to FIG. 4, liquid to be purified enters inlet 10 and passes through depletion compartments 12, through depletion compartments 14 and then is recovered from outlet 16. Concentrating liquid is passed through inlet 18, through concentration compartments 20 and 22 thence through outlet 24 to drain. Liquid electrolyte is circulated through electrode compartments 26, 28, 30 and 32 from inlets 34 and is discarded to drain through outlets 36. When operated in the mode shown in FIG. 1, electrode compartments 26 and 30 comprise cathodes and electrode compartments 28 and 32 comprise anodes.

Figure 5:
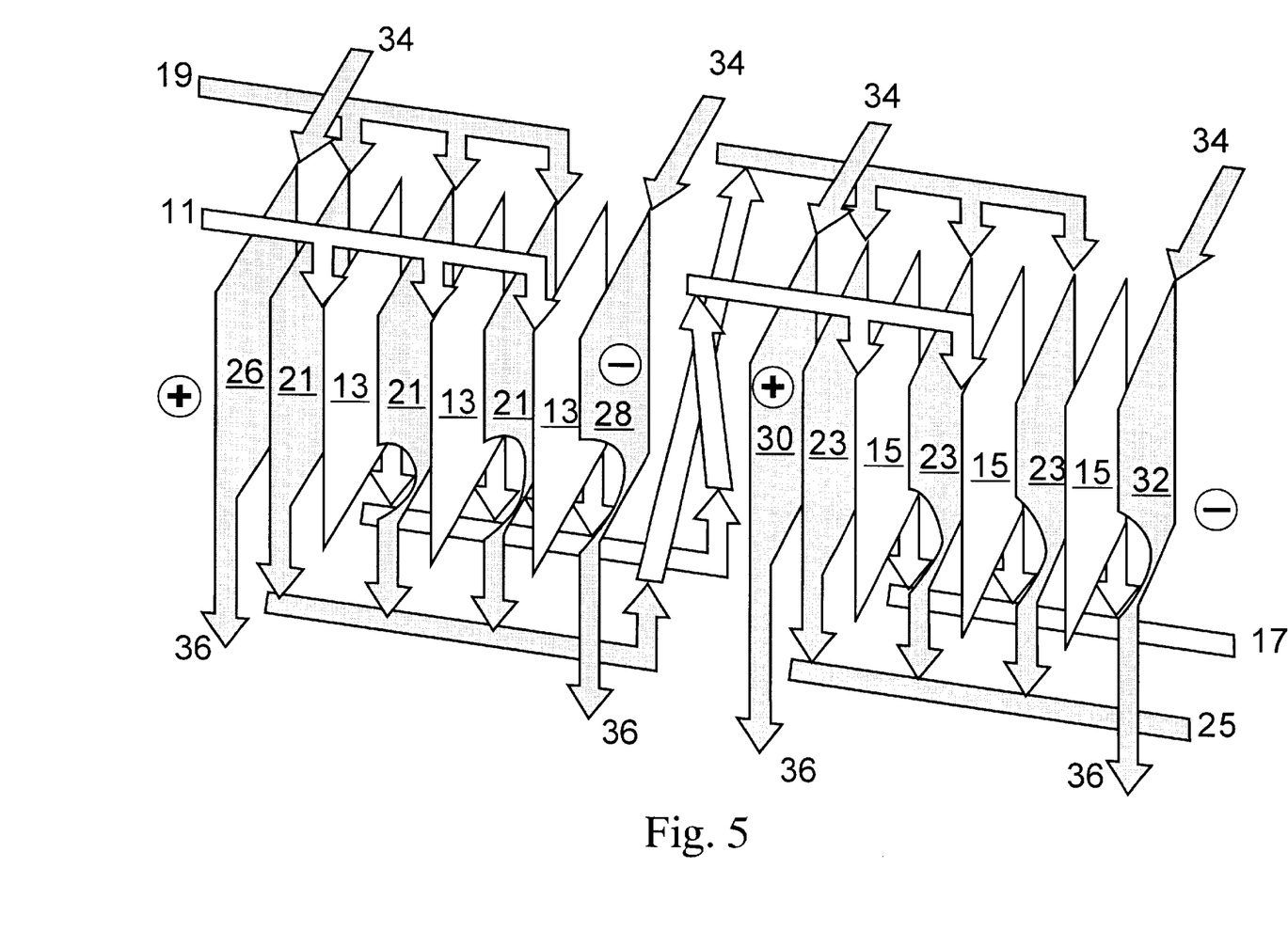

Referring to FIG. 5, the polarity of the electrodes is reversed such that electrodes 26 and 30 comprise anodes and electrodes 28 and 32 comprise cathodes where a liquid electrolyte is circulated therethrough from inlets 34 and is discarded to drain through outlets 36. Because of the polarity reversal, the depletion compartments 12 of FIG. 4 now become concentration compartments 13 and the depletion compartments 14 of FIG. 3 become concentration compartments 15. Similarly, the concentration compartments 20 and 22 of FIG. 4 become concentration compartments 15. Similarly, the concentration compartments 20 and 22 of FIG. 4 become depletion compartments 21 and 23. Therefore, the product outlets 16 of FIG. 5 become a waste stream 17 while the waste stream 24 of FIG. 5 becomes a product stream 25.

Figure 6:
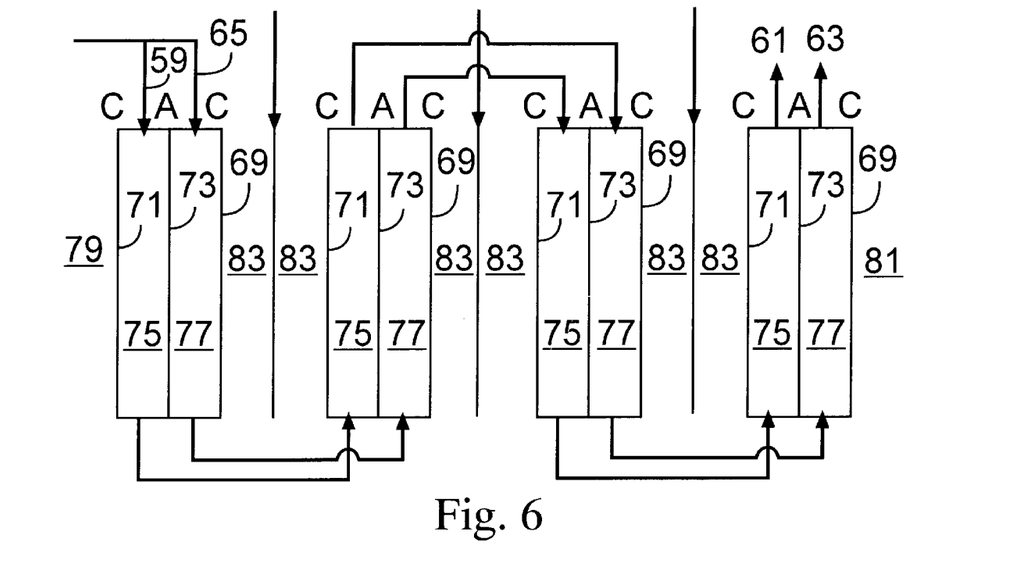
FIG. 6 is a schematic view showing a flow path arrangement useful when reversing polarity, as occurs in the product embodiment illustrated in FIGS. 4 and 5.
Figure 7:
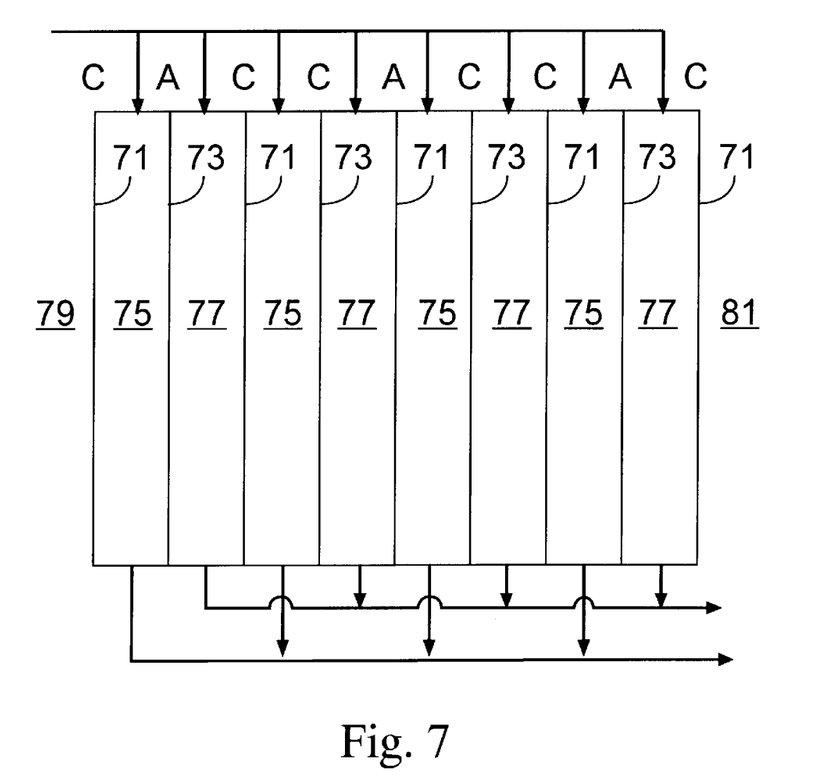
FIG. 7 is a schematic view showing another flow path arrangement useful for reversing polarity.

Referring to FIG. 6, an arrangement of dual compartments is shown, each of which includes two cation permeable membranes 69 and 71 and anion permeable membrane 73 separated by and bonded to spacers 75 and 77 as set forth above. When the polarity of electrode 79 is negative the compartments including spacer 75 is an ion depleting compartment while the compartment including spacer 77 is an ion concentration compartment. When the polarity of electrode 79 is positive and the polarity of electrode 81 is negative, the compartments including spacer 75 become ion concentration compartments and the compartments including spacer 77 comprise ion depletion compartments. The liquid for the depletion and concentration compartments passing through 75 and 77 can be passed in series as shown in FIG. 6 or in parallel as shown in FIG. 7 therethrough or combination of series and parallel flow. An optional construction is shown in FIG. 6 wherein the dual compartment structures are separated by neutral zones 83 which include screens 85. The neutral zones 83 merely function to prevent contact between membranes of adjacent dual compartments. The liquid for the neutral zones 83 can be passed in series or in parallel therethrough and can be fed by the feed stream, electrode streams, depletion or concentration streams as desired and can be directed to waste or fed to the anode or cathode compartments as desired prior to exiting the apparatus.

EXAMPLES

A series of electrodeionization modules (i.e., EDI-10 modules available from Millipore Corporation of Bedford, Mass.), each containing 8 diluting cells, were exposed to a high $CO_2$ water stream and tested for long periods of time (20–100 days) at a constant voltage of 45–55 volts. The dilute flow rate was set at 10 liters per hour (LPH), at a temperature of 22° C. All EDI modules were fed with RO water, with $CO_2$ and $Ca^{++}$ added as follows:

| Component | Conc. (ppm) | Conc. (mequiv./liter) |
|---|---|---|
| RO water (2 µS/cm) | 0.9* | 0.015 |
| $CO_2$ | 35–45 | 0.795–1.023 |
| $Ca(NO_3)_2$ | 5 | 0.040 |
| Total Ionic Concentration | | 0.850–1.078 |

*assuming all conduction of the RO water is attributed to NaCl.

Over time, the electrical impedance of all the modules increases resulting in a gradual decrease in current. Some of the modules were new, some were old modules returned from customers due to "low water quality". The current at which the water quality of the product water dropped to less than 3 mega-ohm-cm was measured, and reported as the "threshold current" in milli-Amps (mA).

Figure 8:
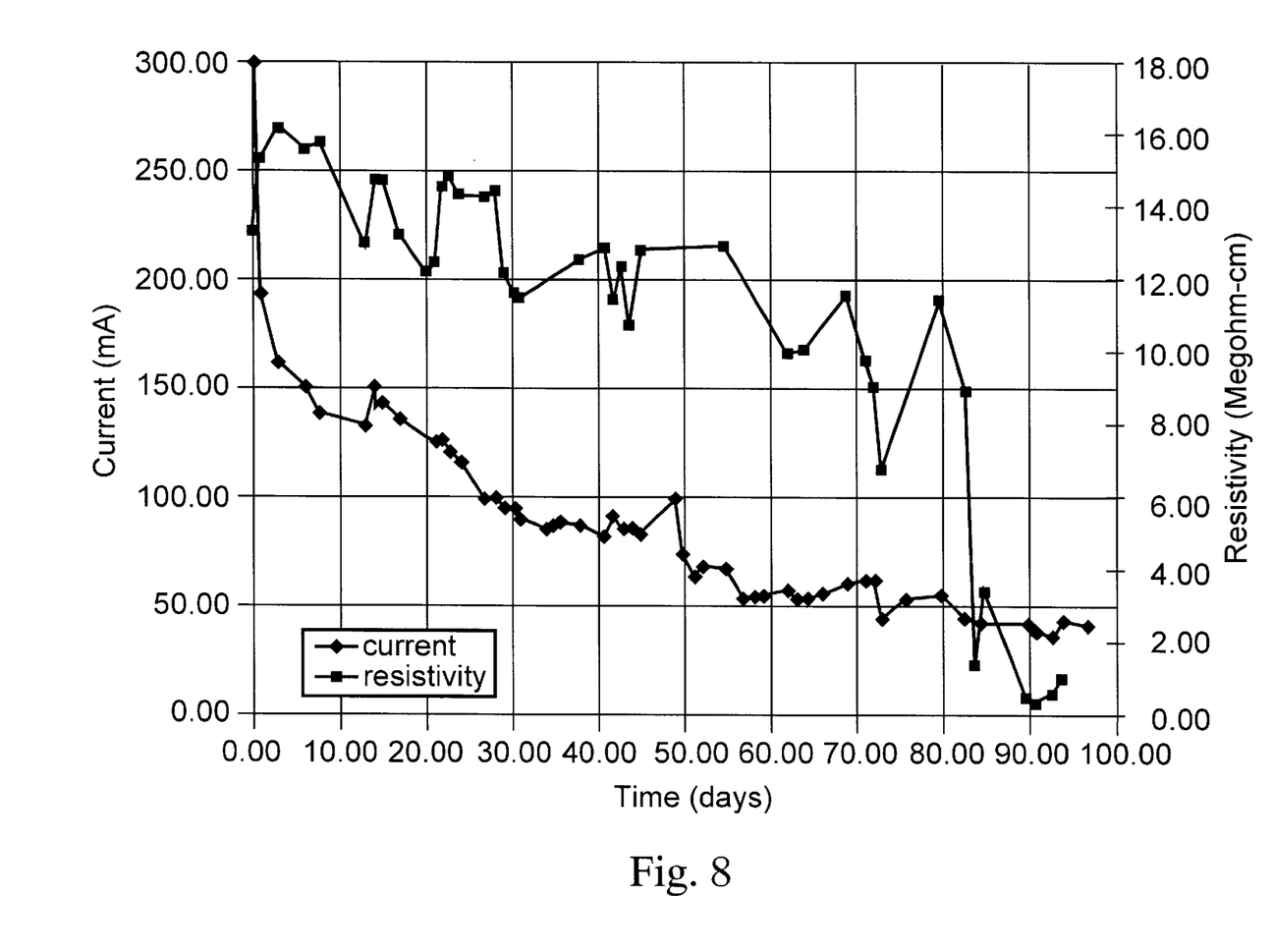
FIGS. 8 and 9, explained in the Examples herein below, sets forth performance curves for certain electrodeionization modules.

FIG. 8 shows the performance curve for an EDI module operated in accordance with conventional practice. A high initial current of 300 mA at the start of the test was observed. The water quality remained above 10 mega-ohm-cm until the current dropped below 50 mA, at which point the water quality rapidly dropped to less than 1 mega-ohm-cm.

Figure 9:
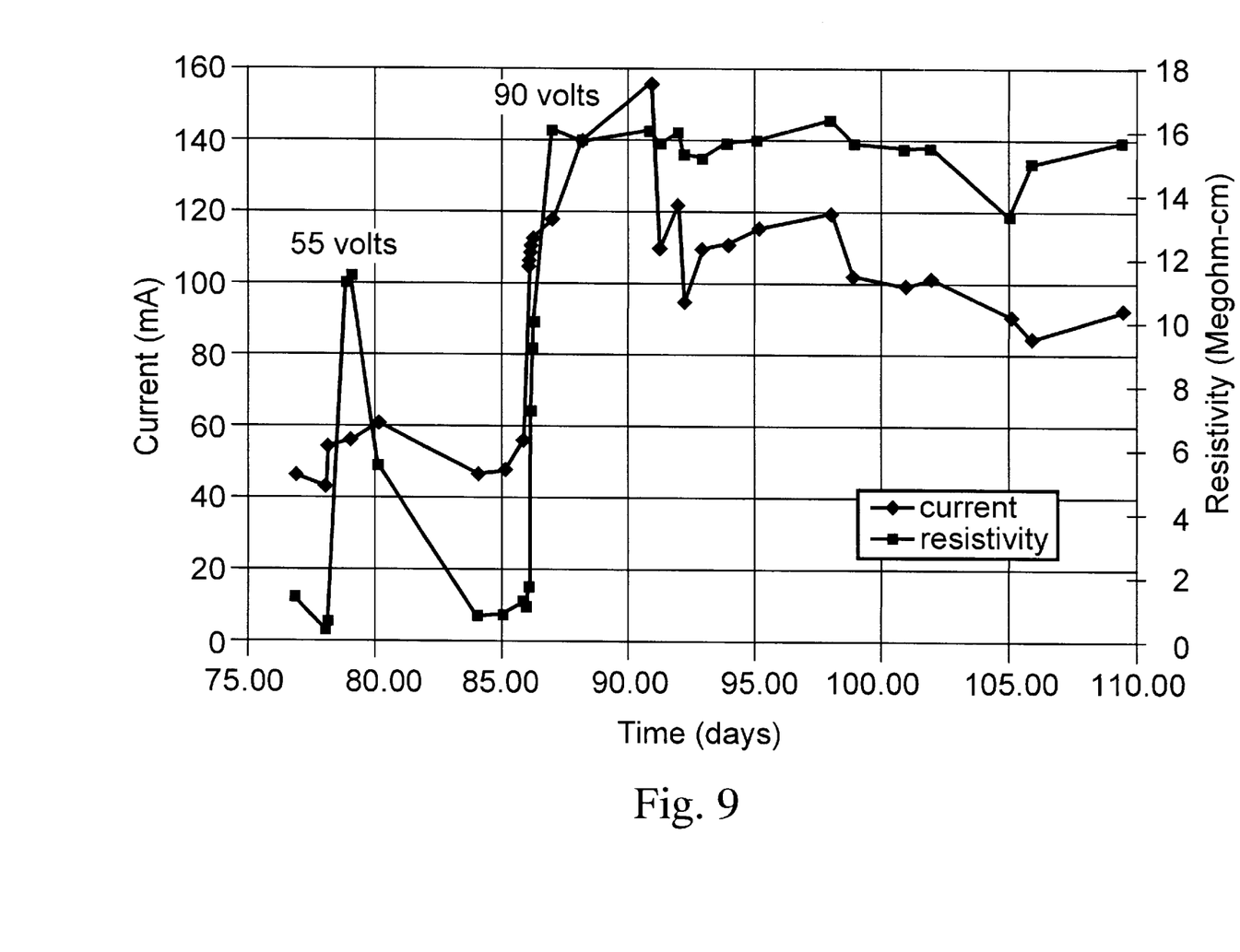

FIG. 9 shows the results of increasing the current by a concomitantly increasing voltage from 50 to 90 volts. When run at 55 volts, the module current gradually decreased below 50 mA, at which point the water quality dropped to a value below 1 mega-ohm-cm. Increasing the voltage to 90 V, which increased the current to 100+ mA, the water quality immediately increased above 14 mega-ohm-cm.

The table below summarizes the threshold current measured for several modules tested, which in the majority of the cases is between 50 and 70 mA.

| Module # | QC(I) (mAmps) | Life (days) | Threshold, I (mAmps) |
|---|---|---|---|
| Module #1 | 97 | 20 | 60 |
| Module #2 | 129 | 20 | 70 |
| Module #3 | 137 | 24 | 70 |
| Module #4 | 132 | 24 | 70 |
| Module #5 | 157 | 68 | 50 |
| Module #6 | 161 | 70 | 50 |
| Module #7 | 154 | 78 | 52 |
| Module #8 | 229 | 78 | 48 |
| Module #9 | 204 | 85 | 44 |
| Module #10 | 181 | 90 | 50 |

The threshold current measured by this methodology is a lower bound estimate of the true threshold current, the true threshold current being the current at which the module will perform acceptably (i.e., to practitioners in the field) at steady state. The reason for the difference between the measured and the true threshold current is that the ion exchange media inside the EDI module has some reserve capacity, therefore, there is a lag time between the current set and the attainment of equilibrium at that current. Hence, with the above methodology, the measured threshold current is in general slightly lower than the true threshold current.

According to the present invention, for water with an ionic concentration of 0.850 and 1.078 mequiv/l, the minimum (theoretical) current, $I^*$, is equal to 28.5 and 36.1 mA, respectively. In all cases the threshold current is equal to 1.5–2 times $I^*$.

The results of Modules Nos. 1 to 10 demonstrate the limitations of the prior art: i.e., When the module impedance is too low, the current is too high, increasing the risk of scaling; and, when the module impedance is too high, the current is too low, resulting in low water quality.

We claim:

1. A water purification process comprising the following steps:

(a) providing an electrodeionization module comprising, between a cathode and an anode, at least one ion depletion compartment interposed adjacently between a pair of ion concentration compartments, each compartment containing an ion-exchange medium;

(b) passing water through said ion depletion compartment contemporaneously with passing water through said ion concentration compartments;

(c) supplying a current between the anode and the cathode in the range of about $1.5 \times I^*$ and about $15 \times I^*$, (i) wherein $I^*=(Q \times C \times F)/(3600 \times N)$, $I^*$ being a theoretical minimum current measured in amps, Q being the total water flow rate passing through all ion depletion compartments in said electrodeionization module measured in liters/hour, C being total ion concentration measured in equivalents/liter, F being Faraday's Constant of 96,500 coulombs/equivalent, and N being total number of ion depletion compartments, and (ii) wherein said current is supplied by a power source capable of automatically increasing or decreasing voltage in response to a change in the electrical impedance of the electrodeionization module to maintain constant said current; and (d) recovering water from said ion depletion compartment.

2. The process of claim 1, wherein said ion exchange medium comprises a mixture of anion exchange resin beads and cation exchange resin beads, and wherein the volume ratio of anion exchange resin beads to cation exchange resin beads in said ion depletion compartments is between 4.0 and 0.5.

3. The process of claim 1, wherein the current supplied between the anode and the cathode is greater than $2.0 \times I^*$.

4. The process of claim 1, wherein each of said ion depletion compartments comprise a spacer and a plurality of sub-compartments formed by a plurality of ribs extending along the length of each of said ion depletion compartments each of said sub-compartments having a width defined by the distance between said ribs of between about 0.3 and 4 inches and a thickness between about 0.05 and 0.25 inches.

5. The process of claim 4, wherein the width of said sub-compartment is between about 0.5 and 1.5 inches.

6. The process of claim 4, wherein the thickness of said sub-compartment is between about 0.06 and 0.125 inches.

* * * * *